US009467423B2

(12) United States Patent  
Gu et al.

(10) Patent No.: US 9,467,423 B2  
(45) Date of Patent: Oct. 11, 2016

(54) NETWORK LABEL ALLOCATION METHOD, DEVICE, AND SYSTEM

(71) Applicant: HUAWEI TECHNOLOGIES CO., LTD., Shenzhen, Guangdong (CN)

(72) Inventors: Rui Gu, Warsaw (PL); Jie Dong, Beijing (CN); Lianshu Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 18 days.

(21) Appl. No.: 14/561,713

(22) Filed: Dec. 5, 2014

(65) Prior Publication Data

US 2015/0089629 A1   Mar. 26, 2015

Related U.S. Application Data

(63) Continuation of application No. PCT/CN2013/076838, filed on Jun. 6, 2013.

(30) Foreign Application Priority Data

Jun. 6, 2012  (CN) .......................... 2012 1 0184163

(51) Int. Cl.
*G06F 9/00* (2006.01)
*H04L 29/06* (2006.01)
(Continued)

(52) U.S. Cl.
CPC ....... *H04L 63/0272* (2013.01); *H04L 12/4633* (2013.01); *H04L 45/14* (2013.01); *H04L 45/507* (2013.01)

(58) Field of Classification Search
CPC .......................... H04L 63/0272; H04L 45/14
USPC .............................................. 726/15, 12, 13
See application file for complete search history.

(56) References Cited

U.S. PATENT DOCUMENTS 7,468,956 B1 * 12/2008 Leelanivas .......... H04L 12/4675  
370/255  
8,824,331 B1 *  9/2014 Alaettinoglu ........... H04L 45/74  
370/254  
(Continued)

FOREIGN PATENT DOCUMENTS

CN          101527740        9/2009  
CN          102377630        3/2012  
(Continued)

OTHER PUBLICATIONS

Y. Rekhter et al., Ed., "A Border Gateway Protocol 4 (BGP-4)," The Internet Society, Jan. 2006, url: http://www.ietf.org/rfc/rfc4271.txt.  
(Continued)

*Primary Examiner* — Saleh Najjar  
*Assistant Examiner* — Peiliang Pan  
(74) *Attorney, Agent, or Firm* — Staas & Halsey LLP

(57) ABSTRACT

Embodiments of the present invention provide a network label allocation method, a device, and a system, which enable a local PE to distinguish packets from different remote PEs. The method includes: generating, by a local provider edge PE, a VPN label route for each remote PE, where VPN labels in VPN label routes of different remote PEs are different, and the remote PE and the local PE at least belong to a same VPN; and sending the VPN label route to the remote PE, so that the remote PE separately matches an IP address of the remote PE with a target device IP address in the VPN label route, and matches an import route target RT of each VRF of the remote PE with a route target RT in the VPN label route, a packet related to a successfully matched VRF.

20 Claims, 6 Drawing Sheets

(51) Int. Cl.
*H04L 12/723* (2013.01)
*H04L 12/46* (2006.01)
*H04L 12/721* (2013.01)

(56) References Cited

U.S. PATENT DOCUMENTS

| | | | | |
|---|---|---|---|---|
| 2004/0196827 | A1* | 10/2004 | Xu | H04L 12/24 370/352 |
| 2004/0202171 | A1* | 10/2004 | Hama | H04L 12/4641 370/395.1 |
| 2005/0053079 | A1* | 3/2005 | Havala | H04J 3/1611 370/400 |
| 2006/0146696 | A1* | 7/2006 | Li | H04L 12/5695 370/218 |
| 2006/0171323 | A1* | 8/2006 | Qian | H04L 45/10 370/252 |
| 2007/0110025 | A1* | 5/2007 | Guichard | H04L 63/0272 370/351 |
| 2007/0121486 | A1* | 5/2007 | Guichard | H04L 45/02 370/216 |
| 2007/0133577 | A1* | 6/2007 | Dong | H04L 12/4641 370/401 |
| 2008/0031157 | A1* | 2/2008 | Tamboise | H04L 41/08 370/254 |
| 2008/0172732 | A1* | 7/2008 | Li | H04L 12/4641 726/15 |
| 2008/0291921 | A1* | 11/2008 | Du | H04L 12/4641 370/395.53 |
| 2008/0298360 | A1* | 12/2008 | Wijnands | H04L 12/18 370/389 |
| 2009/0285089 | A1* | 11/2009 | Srinivasan | H04L 12/4633 370/218 |
| 2009/0296579 | A1* | 12/2009 | Dharwadkar | H04L 12/4641 370/235 |
| 2009/0296714 | A1* | 12/2009 | Gerber | H04L 12/4641 370/395.31 |
| 2010/0110928 | A1 | 5/2010 | Elias | |
| 2010/0284409 | A1* | 11/2010 | Lv | H04L 12/4675 370/395.31 |
| 2011/0128969 | A1* | 6/2011 | Scholl | H04L 45/00 370/411 |
| 2011/0286466 | A1* | 11/2011 | Ge | H04L 45/04 370/401 |

FOREIGN PATENT DOCUMENTS

| | | |
|---|---|---|
| CN | 102449964 | 5/2012 |
| EP | 2 720 415 A1 | 4/2014 |
| EP | 2 753 022 A1 | 7/2014 |

OTHER PUBLICATIONS

E. Rosen et al., "BGP/MPLS IP Virtual Private Networks (VPNs)," The Internet Society, Feb. 2006.

T. Bates et al., "Multiprotocol Extensions for BGP-4," The IETF (Internet Engineering Task Force) Trust, Jan. 2007.

E. Rosen et al., Ed., "Multicast in MPLS/BGP IP VPNs," The IETF (Internet Engineering Task Force) Trust and the persons identified as the document authors, Feb. 2012.

PCT Forms PCT/ISA/210, PCT/ISA/220, and PCT/ISA/237, including International Search Report, mailed Sep. 12, 2013 for corresponding International Patent Application No. PCT/CN2013/076838.

Extended European Search Report mailed Feb. 25, 2015 for corresponding European Patent Application No. 13800524.4.

International Search Report, mailed Sep. 12, 2013, in corresponding International Patent Application No. PCT/CN2013/076838 (4 pp.).

* cited by examiner

NETWORK LABEL ALLOCATION METHOD, DEVICE, AND SYSTEM

CROSS-REFERENCE TO RELATED APPLICATIONS

This application is a continuation of International Application No. PCT/CN2013/076838, filed on Jun. 6, 2013, which claims priority to Chinese Patent Application No. 201210184163.0, filed on Jun. 6, 2012, both of which are hereby incorporated by reference in their entireties.

TECHNICAL FIELD

Embodiments of the present invention relate to the communications field, and in particular, to a network label allocation method, a device, and a system.

BACKGROUND

A BGP (Border Gateway Protocol, border gateway protocol) is an exterior gateway protocol for communication between different autonomous systems. A BGP-based MPLS (Multi Protocol Label Switching, multi protocol label switching) IP (Internet Protocol, Internet Protocol) VPN (Virtual Private Network, virtual private network) is generally called an L3VPN (Level3 VPN, Level 3 virtual private network). In the L3VPN, a RD (Route Distinguisher, route distinguisher RD) is generally used to distinguish overlapping VPN route prefixes in different VPNs, and an RT (Route Target) is used to identify a VPN membership.

In an existing L3VPN, when publishing VPN routing information by using the BGP, a local PE (Provider Edge, provider edge) allocates a specific VPN label to a VPN route prefix belonging to a specific VPN and publishes the VPN label to all remote PEs belonging to a same VPN. In this way, when forwarding packets to the local PE, the remote PEs belonging to the same VPN all carry a same VPN label. A BGP/MPLS L3VPN needs to use an MPLS tunnel for bearing. When an LSP (Label Switching Path, label switching path) established by using an LDP (Label Distribution Protocol, label distribution protocol) is used to bear the L3VPN, because the LDP LSP belongs to a multi-point to point type, that is, an egress node (Egress) of the LSP cannot determine a source of a packet according to an LSP tunnel label, and packets sent by different remote PEs carry a same VPN label, consequently the local PE cannot distinguish the packets from the different remote PEs. For fault management and performance measurement of the L3VPN, two ends for sending and receiving a packet need to be determined; therefore, in this case, fault management and performance measurement of the L3VPN cannot be implemented.

SUMMARY

Embodiments of the present invention provide a network label allocation method, a device, and a system, which enable a local PE to distinguish packets from different remote PEs, thereby laying a foundation for fault management and performance measurement of an L3VPN.

To achieve the foregoing objective, the embodiments of the present invention use the following technical solutions:

According to one aspect, a network label allocation method is provided and includes:

generating, by a local provider edge PE, a VPN label route carrying a VPN label for each remote PE, where VPN labels in VPN label routes of different remote PEs are different, and the remote PE and the local PE at least belong to a same VPN; and sending, by the local PE, the VPN label route to the remote PE, so that the remote PE separately matches an IP address of the remote PE with a target device IP address in the VPN label route, and matches an import route target RT of each virtual routing forwarding VRF of the remote PE with a route target RT in the VPN label route, so as to make the remote PE carry the VPN label when the remote PE sends, to the local PE, a packet related to a successfully matched VRF.

According to one aspect, a network label allocation method is provided and includes:

receiving, by a remote PE, a VPN label route sent by a local PE, where the local PE and the remote PE at least belong to a same VPN, and the VPN label route includes a VPN label different from that of another remote PE;

matching, by the remote PE separately, an IP address of the remote PE with a target device IP address in the VPN label route, and matching an import route target RT of each virtual routing forwarding VRF of the remote PE with a route target RT in the VPN label route; and carrying, by the remote PE, the VPN label when sending, to the local PE, a packet related to a successfully matched VRF, so that the local PE distinguishes the packet sent by the remote PE from a packet sent by the another remote PE.

According to one aspect, a local provider edge is provided and includes:

a first generating unit, configured to generate a VPN label route for each remote PE, where VPN labels in VPN label routes of different remote PEs are different, and the remote PE and the local PE at least belong to a same VPN; and a first sending unit, configured to send the VPN label route carrying a VPN label to the remote PE, so that the remote PE separately matches an IP address of the remote PE with a target device IP address in the VPN label route, and matches an import route target RT of each virtual routing forwarding VRF of the remote PE with a route target RT in the VPN label route, so as to make the remote PE carry the VPN label when the remote PE sends, to the local PE, a packet related to a successfully matched VRF.

According to one aspect, a remote provider edge is provided and includes:

a second receiving unit, configured to receive a VPN label route sent by a local PE, where the local PE and the remote PE at least belong to a same VPN, and the VPN label route includes a VPN label different from that of another remote PE;

a second matching unit, configured to separately match an IP address of the remote PE with a target device IP address in the VPN label route, and match an import route target RT of each virtual routing forwarding VRF of the remote PE with a route target RT in the VPN label route; and a second sending unit, configured to carry the VPN label when the remote PE sends, to the local PE, a packet related to a successfully matched VRF, so that the local PE distinguishes the packet sent by the remote PE from a packet sent by the another remote PE.

According to one aspect, a communications system is provided and includes:

the foregoing local provider edge; and the foregoing remote provider edge.

The embodiments of the present invention provide the network label allocation method, the device, and the system. The network label allocation method includes: generating, by a local provider edge PE, a VPN label route for each remote PE, where VPN labels in VPN label routes of different remote PEs are different, and the remote PE and the local PE at least belong to a same VPN; and sending, by the local PE, the VPN label route to the remote PE, so that the remote PE separately matches an IP address of the remote PE with a target device IP address in the VPN label route, and matches an import route target RT of each virtual routing forwarding VRF of the remote PE with a route target RT in the VPN label route, so as to make the remote PE carry the VPN label when the remote PE sends, to the local PE, a packet related to a successfully matched VRF. In this way, because the local PE sends a different VPN label route to each remote PE, when each remote PE sends a packet of a corresponding VPN to the local PE, the local PE can distinguish the sending end PE of the packet according to a different VPN label carried in the packet. Therefore, the local PE can distinguish packets from different remote PEs, and a foundation is laid for fault management and performance measurement of an L3VPN.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
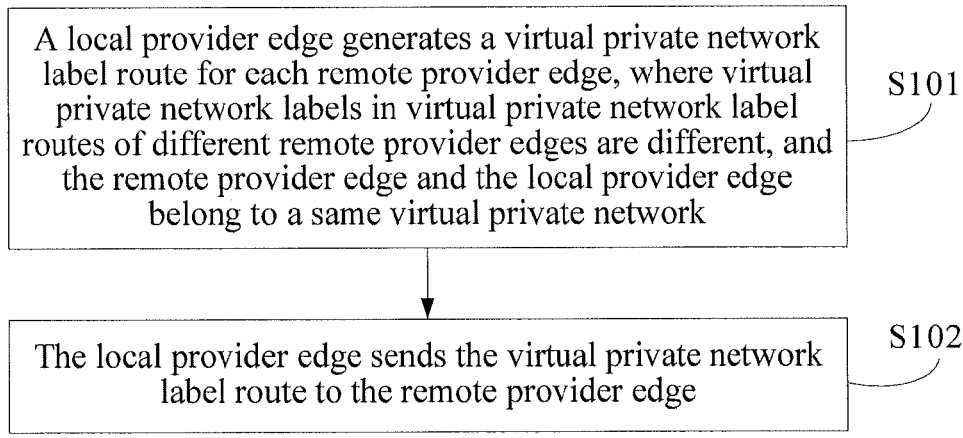
FIG. 1 is a flowchart of a network label allocation method according to an embodiment of the present invention.

An embodiment of the present invention provides a network label allocation method. As shown in FIG. 1, the method includes:

S101: A local PE generates a VPN label route for each remote PE, where VPN labels in VPN label routes of different remote PEs are different, and the remote PE and the local PE at least belong to a same VPN.

The VPN label route may include: an IP address of the local PE, an RT (Route Target, route target), a target device IP address, and a VPN label. As shown in Table 1:

TABLE 1

| Length of the IP address of the local PE (1 byte) |
| IP address of the local PE (a variable length) |
| Length of the target device IP address (1 byte) |
| Target device IP address (a variable length) |
| N RTs (N × 8 bytes) |
| VPN label (3 bytes) |

The length field of the IP address of the local PE is used to indicate the length of the IP address of the local PE. Because there may be multiple types of IP addresses, such as, IPV4 and IPV6, lengths of the IP addresses thereof are different. The field of the IP address of the local PE is used to indicate an IP address of the PE, and the number of bytes of the field is related to the length field of the IP address of the local PE. Exemplarily, when it is indicated that the length of the IP address of the local PE is 4 bytes, a length of the field of the IP address of the local PE is four bytes, and an IP address type in the field is IPV4. Similarly, the length field of the target device IP address is used to indicate a length of an IP address of a target PE, and a field of the target device IP address is used to indicate the IP address of the target PE. The RT field carries information about an Export (export) RT, of the local PE, matched with an Import (import) RT in a member discovery route of a target device, and the information may also be carried by using a BGP extended community attribute. The field of the VPN label is used to indicate the VPN label, and in a VPN label route sent by the local PE for each remote PE, a VPN label in the field is different. Particularly, relative to the local PE, the target device may be considered as a remote PE; therefore, in an actual application, the target device in the VPN label route is generally considered as a remote PE by default.

S102: The local PE sends the VPN label route to the remote PE, so that the remote PE separately matches an IP address of the remote PE with a target device IP address in the VPN label route, and matches an import route target RT of each VRF (Virtual Routing Forwarding, virtual routing forwarding) of the remote PE with a route target RT in the VPN label route, so as to make the remote PE carry the VPN label when the remote PE sends, to the local PE, a packet related to a successfully matched VRF.

In this way, because the local PE sends a different VPN label route to each remote PE, when each remote PE sends a packet of a corresponding VPN to the local PE, the local PE can distinguish the sending end PE of the packet according to a different VPN label carried in the packet. Therefore, the local PE can distinguish packets from different remote PEs, and a foundation is laid for fault management and performance measurement of an L3VPN.

Particularly, before step S101, the network label allocation method provided in the embodiment of the present invention may further include: receiving, by the local PE, a VPN member discovery route sent by the remote PE; and matching, by the local PE, an Export RT of each VRF of the local PE with an Import RT in the VPN member discovery route, and if the matching succeeds, determining that successfully matched VRFs in the remote PE and the local PE belong to a same VPN.

The VPN member discovery route includes: an IP address of the remote PE and the Import RT. When an Export RT, of the VRF same as the Import RT in the VPN member discovery route, exists in the local PE, step S101 specifically includes: setting the target device IP address in the VPN label route to be the same as the IP address of the remote PE in the VPN member discovery route; and making the RT in the VPN label route include an Export RT of the successfully matched VRF in the local PE.

Figure 2:
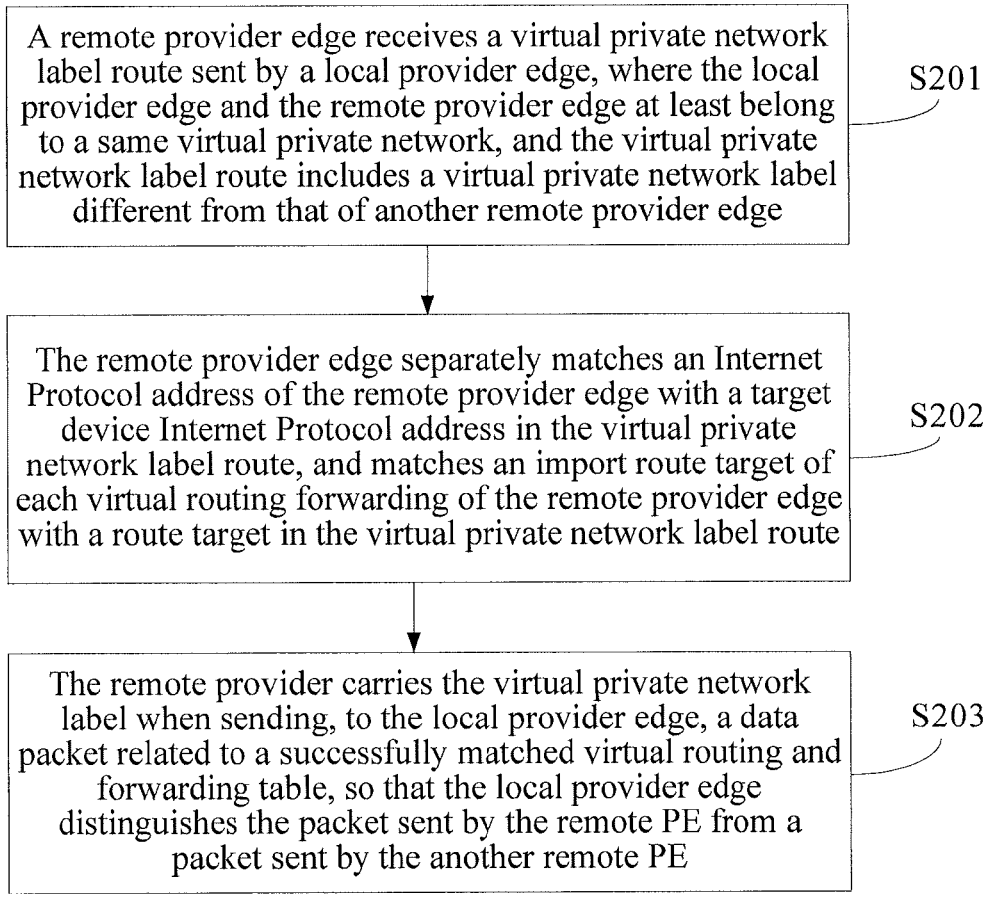
FIG. 2 is a flowchart of another network label allocation method according to an embodiment of the present invention.

An embodiment of the present invention provides a network label allocation method. As shown in FIG. 2, the method includes:

S201: A remote PE receives a VPN label route sent by a local PE, where the local PE and the remote PE at least belong to a same VPN, and the VPN label route includes a VPN label different from that of another remote PE.

Exemplarily, the VPN label route includes: an IP address of the local PE, an RT, a target device IP address, and the VPN label. Particularly, the VPN label route may further include a RD, of the local PE, for identifying a VRF generating the VPN label route.

S202: The remote PE separately matches an IP address of the remote PE with a target device IP address in the VPN label route, and matches an import route target RT of each virtual routing forwarding VRF of the remote PE with a route target RT in the VPN label route.

S203: The remote PE carries the VPN label when sending, to the local PE, a packet related to a successfully matched VRF, so that the local PE distinguishes the packet sent by the remote PE from a packet sent by the another remote PE.

In this way, because the VPN label route, for the remote PE, received by the remote PE, is different from a VPN label route of another PE, when the remote PE sends a packet, namely, a packet related to the successfully matched VRF, of a corresponding VPN to the local PE after the remote PE matches the successfully obtained VPN label route for the remote PE, the remote PE carries the VPN label in the VPN label route. Therefore, the local PE can distinguish packets from different remote PEs, and a foundation is laid for fault management and performance measurement of an L3VPN.

Particularly, before step S201, the method may further include: generating, by the remote PE, a VPN member discovery route; and sending, by the remote PE, the VPN member discovery route to the local PE, so that the local PE determines whether the remote PE and the local PE belong to a same VPN. The VPN member discovery route includes: an IP address of the remote PE and an Import RT. As shown in Table 2:

TABLE 2

Length of the IP address of the remote PE (1 byte)
Length of the IP address of the remote PE (a variable length)
Import RT-1 (8 bytes)
...
Import RT-n (8 bytes)

The length field of the IP address of the remote PE is used to indicate a length of the IP address of the remote PE, and the field of the IP address of the remote PE is used to indicate the IP address of the remote PE. Reference may be made to a related explanation in Table 1 for a detailed explanation. The Import RT field indicates the Import RT, and multiple fields may exist. Exemplarily, the Import RT field may carry all Import RTs on the PE.

Further, after step S202, the method may further include:
when the IP address of the remote PE and the target device IP address in the VPN label route are the same, and an Import RT, of the VRF, same as the RT in the VPN label route, exists, determining that the matching succeeds, and importing (Import) the VPN label route in the successfully matched VRF in the remote PE, where "importing" may also be referred to as "introducing", and represents an action of adding a new route to a VRF table.

Further, step S203 specifically includes: recording, by the remote PE, the successfully matched VRF and routing information in the successfully matched VRF; and sending, by the remote PE, the packet in a VPN to which the successfully matched VRF belongs, and when a next hop of a VPN route of the packet is the same as an IP address, of the local PE, recorded in label routing information in the VRF, carrying the VPN label in the packet according to label routing information in the successfully matched VRF.

Figure 3:
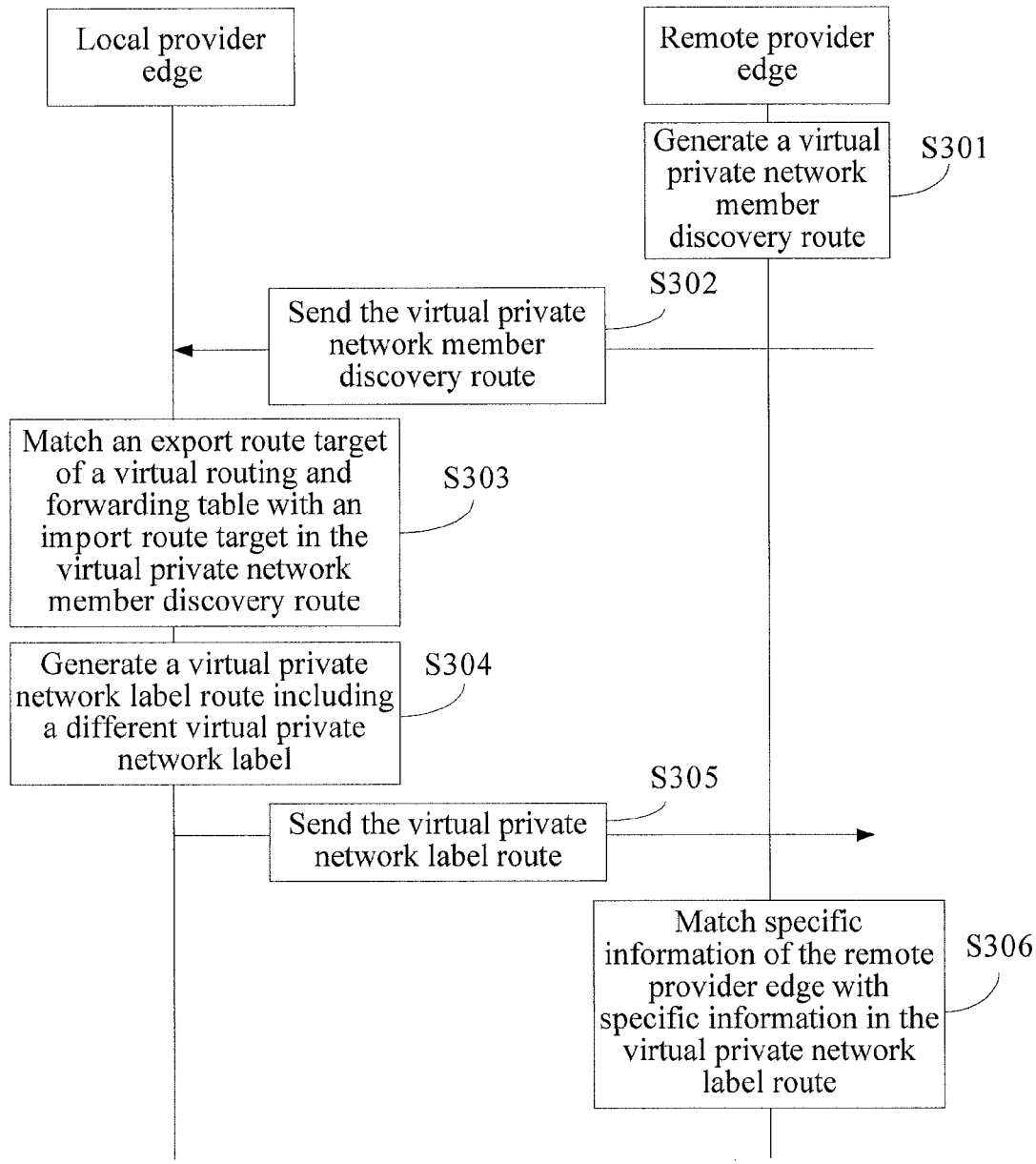
FIG. 3 is a flowchart of still another network label allocation method according to an embodiment of the present invention.

Exemplarily, an embodiment of the present invention provides a network label allocation method. As shown in FIG. 3, the method includes:

S301: A remote PE generates a VPN member discovery route.

As shown in Table 2, the VPN member discovery route may include: an IP address of the remote PE and an Import route target.

S302: The remote PE sends the VPN member discovery route to a local PE.

S303: The local PE matches an Export RT of a VRF with the Import RT in the VPN member discovery route.

The local PE matches an Export RT of each VRF of the local PE with the Import RT in the VPN member discovery route; and if the matching succeeds, determines that successfully matched VRFs in the remote PE and the local PE belong to a same VPN. If no Export RT that is the same as the Import RT in the VPN member discovery route exists in the local PE, it is determined that the remote PE and the local PE do not belong to a same VPN. Particularly, there may be multiple VRFs whose export route targets Export RT in the local PE match with the import route target Import RT in the VPN member discovery route.

In the embodiment of the present invention, if the remote PE and the local PE belong to a same VPN, and step S304 is performed.

S304: The local PE generates, for each remote PE, a VPN label route including a different VPN label. Step S305 is performed.

As shown in Table 1, the VPN label route may include: an IP address of the local PE, an RT, a target device IP address, and the VPN label. Particularly, the VPN label route may further include a RD, of the local PE, for identifying a VRF generating the VPN label route.

When the local PE successfully matches an Export RT of each VRF with the Import RT in the VPN member discovery route, the target device IP address in the VPN label route is set to be the same as the IP address of the remote PE in the VPN member discovery route. In this way, the VPN label allocated to the remote PE may be sent to the remote PE.

The RT is set to include an Export RT of the successfully matched VRF in the local PE. Exemplarily, when two Export RTs, namely a RT1 and a RT2, of a VRF1 in the local PE, are the same as the Import RT in the VPN member discovery route, the route target RT carried in the VPN label route should include the RT1 and the RT2, and in this case, the RT1 and the RT2 are Export RTs of the successfully matched VRF.

S305: The local PE sends the VPN label route to the remote PE. Step S306 is performed.

S306: The remote PE matches specific information of the remote PE with specific information in the VPN label route.

After receiving the VPN label route, the remote PE sequentially reads fields in the VPN label route; then the remote PE separately matches an IP address of the remote PE with a target device IP address in the VPN label route, and matches an Import RT of a VRF of the remote PE with an RT in the VPN label route; and when the IP address of the remote PE and the target device IP address in the VPN label route are the same, and an Import RT, of a VRF, same as the RT in the VPN label route exists, the matching succeeds, and the VPN label route is imported into the successfully matched VRF in the remote PE. When the IP address of the remote PE and the target device IP address in the VPN label route are not the same, or no Import RT, of the VRF, that is the same as the RT in the VPN label route, exists, the matching fails; and the remote PE may delete or not use the VPN label route.

When information about the remote PE is successfully matched with information in the VPN label route, the remote PE records the successfully matched VRF and routing information in the successfully matched VRF; and the remote PE sends the packet in a VPN to which the successfully matched VRF belongs, and when a next hop of a VPN route of the packet is the same as an IP address, of the local PE, recorded in label routing information in the VRF, carries the VPN label in the packet according to label routing information in the successfully matched VRF.

It should be noted that a sequence of steps in the network label allocation method provided in the embodiments of the present invention may be properly adjusted, and a step may be correspondingly added or deleted according to a condition. A person skilled in the art can easily figure out a modified method within the technical scope disclosed in the present invention, which is not repeatedly described herein.

Particularly, an original L3VPN VPN route publishing process in RFC (Request For Comments, Request For Comments) 4364 (BGP/MPLS IP Virtual Private Networks, Border Gateway Protocol/Multi Protocol Label Switching IP Virtual Private Networks) may not be modified, and is mainly used to publish information about a VPN route prefix (prefix); and a label carried in a VPN route may be used by a conventional PE not supporting the technology of the present invention to forward a VPN packet.

The embodiments of the present invention provide the network label allocation method, where when each remote PE sends a packet to the local PE, the local PE can distinguish the sending end PE of the packet according to a different VPN label carried in the packet. Therefore, the local PE can distinguish packets from different remote PEs, and a foundation is laid for fault management and performance measurement of an L3VPN.

Figure 4:
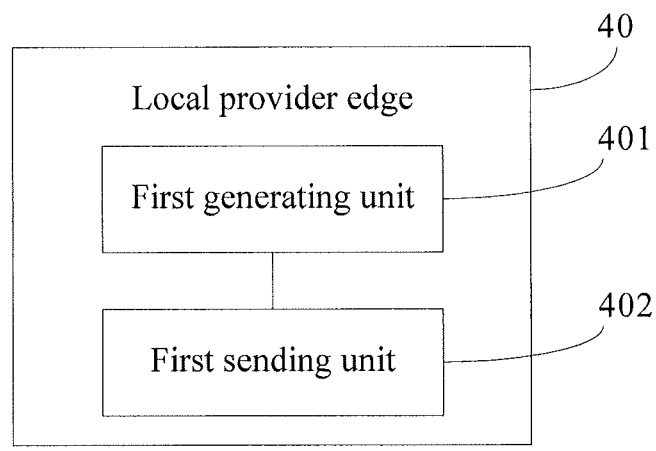
FIG. 4 is a schematic structural diagram of a local provider edge according to an embodiment of the present invention.

An embodiment of the present invention provides a local provider edge 40, as shown in FIG. 4, including:

a first generating unit 401, configured to generate a VPN label route for each remote PE, where VPN labels in VPN label routes of different remote PEs are different, and the remote PE and the local PE at least belong to a same VPN, where the VPN label route may include: an Internet Protocol IP address of the local PE, an RT, a target device IP address, and a VPN label; and a first sending unit 402, configured to send the VPN label route to the remote PE, so that the remote PE separately matches an IP address of the remote PE with a target device IP address in the VPN label route, and matches an import route target RT of each virtual routing forwarding VRF of the remote PE with a route target RT in the VPN label route, so as to make the remote PE carry the VPN label when the remote PE sends, to the local PE, a packet related to a successfully matched VRF.

In this way, because the first generating unit generates, for each remote PE, a VPN label route including a different virtual private network VPN label, the first sending unit sends a different VPN label route to each remote PE, and when each remote PE sends a packet of a corresponding VPN to the local PE, the local PE can distinguish the sending end PE of the packet according to a different VPN label carried in the packet. Therefore, the local PE can distinguish packets from different remote PEs, and a foundation is laid for fault management and performance measurement of an L3VPN.

Figure 5:
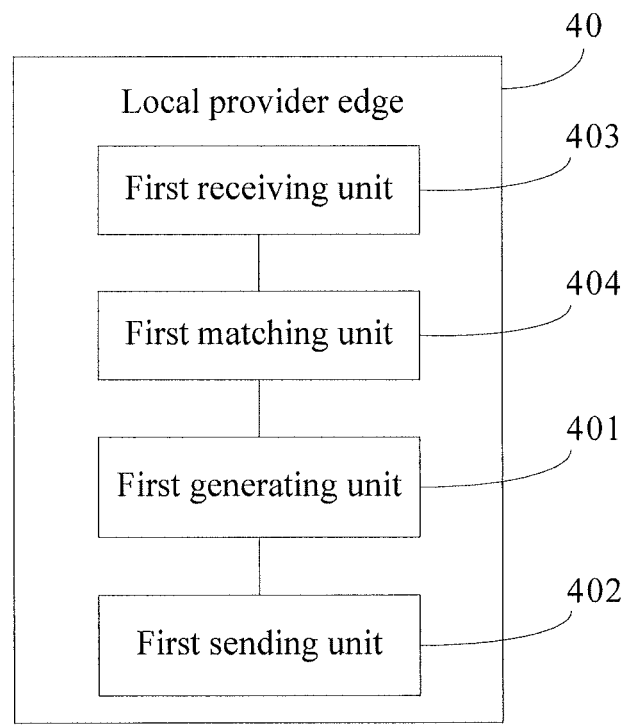
FIG. 5 is a schematic structural diagram of another local provider edge according to an embodiment of the present invention.

Particularly, as shown in FIG. 5, the local provider edge 40 may further include:

a first receiving unit 403, configured to receive a VPN member discovery route sent by the remote PE; and a first matching unit 404, configured to match an Export RT of each VRF of the local PE with an Import RT in the VPN member discovery route; and if the matching succeeds, determine that successfully matched VRFs in the remote PE and the local PE belong to a same VPN.

The VPN member discovery route includes: an IP address of the remote PE and the Import RT.

Particularly, when the matching succeeds, the first generating unit 401 is further configured to:

set the target device IP address in the VPN label route to be the same as the IP address of the remote PE in the VPN member discovery route; and make the RT in the VPN label route include an Export RT of the successfully matched VRF in the local PE.

Figure 6:
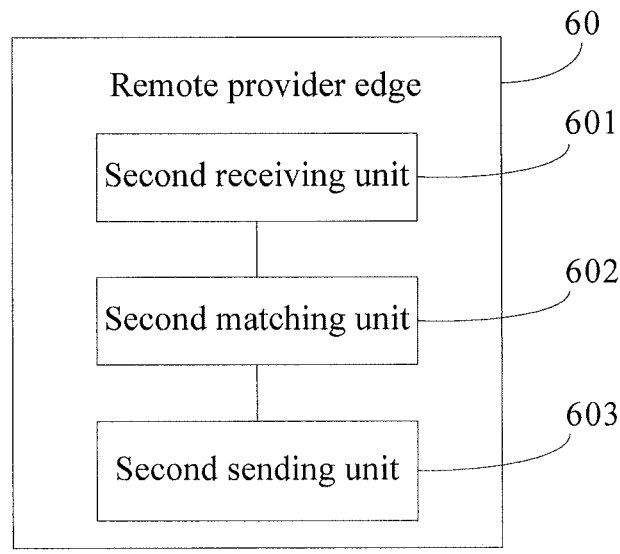
FIG. 6 is a schematic structural diagram of a remote provider edge according to an embodiment of the present invention.

An embodiment of the present invention provides a remote provider edge 60, as shown in FIG. 6, including:

a second receiving unit 601, configured to receive a VPN label route sent by a local PE, where the local PE and the remote PE at least belong to a same VPN, and the VPN label route includes a VPN label different from that of another remote PE;

a second matching unit 602, configured to separately match an IP address of the remote PE with a target device IP address in the VPN label route, and match an import route target RT of each virtual routing forwarding VRF of the remote PE with a route target RT in the VPN label route, where the VPN label route includes: an IP address of the local PE, an RT, a target device IP address, and a VPN label; and a second sending unit 603, configured to carry the VPN label when the remote PE sends, to the local PE, a packet related to a successfully matched VRF, so that the local PE distinguishes the packet sent by the remote PE from a packet sent by the another remote PE.

In this way, because the VPN label route, for the remote PE, received by the second receiving unit is different from a VPN label route of another PE, when the second sending unit sends a packet of a corresponding VPN to the local PE after the second matching unit matches the successfully obtained VPN label route for the remote PE, the second sending unit carries the VPN label in the VPN label route. Therefore, the local PE can distinguish packets from different remote PEs, and a foundation is laid for fault management and performance measurement of an L3VPN.

Figure 7:
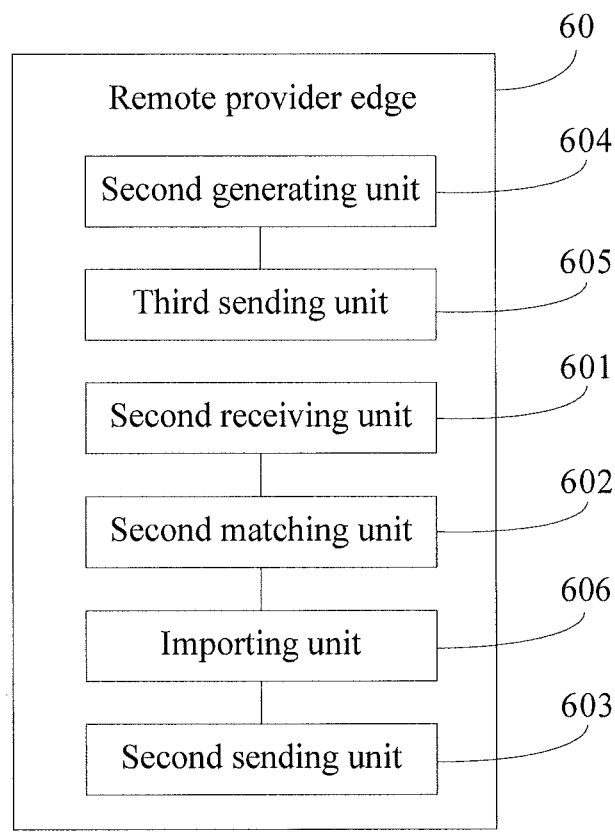
FIG. 7 is a schematic structural diagram of another remote provider edge according to an embodiment of the present invention.

Particularly, as shown in FIG. 7, the device may further include:

a second generating unit 604, configured to generate a VPN member discovery route, where the VPN member discovery route may include: an IP address of the remote PE and the import route target RT;

a third sending unit 605, configured to send the VPN member discovery route to the local PE, so that the local PE determines whether the remote PE and the local PE belong to a same VPN; and an importing unit 606, configured to: when the IP address of the remote PE and the target device IP address in the VPN label route are the same, and an import route target RT, of a VRF, same as the route target RT in the VPN label route exists, determine that the matching succeeds, and import the VPN label route in the successfully matched VRF in the remote PE.

Figure 8:
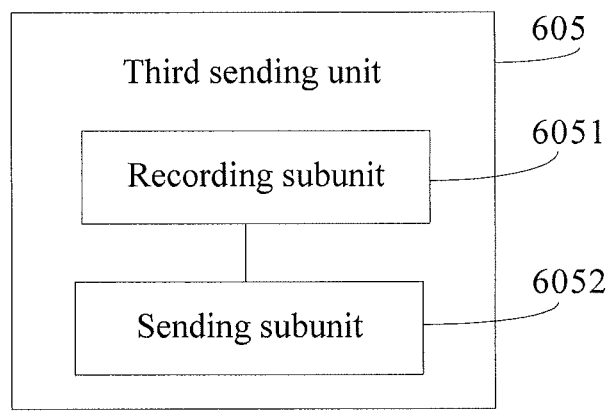
FIG. 8 is a schematic structural diagram of a third sending unit of a remote provider edge according to an embodiment of the present invention.

Further, as shown in FIG. 8, the third sending unit 605 is specifically includes:

a recording subunit 6051, configured to record the successfully matched VRF and routing information in the successfully matched VRF; and a sending subunit 6052, configured to send the packet in a VPN to which the successfully matched VRF belongs, and when a next hop of a VPN route of the packet is the same as an IP address, of the local PE, recorded in label routing information in the VRF, carry the VPN label in the packet according to label routing information in the successfully matched VRF.

An embodiment of the present invention provides a communications system, including any one of the foregoing local provider edges and any one of the foregoing remote provider edges.

Figure 9:
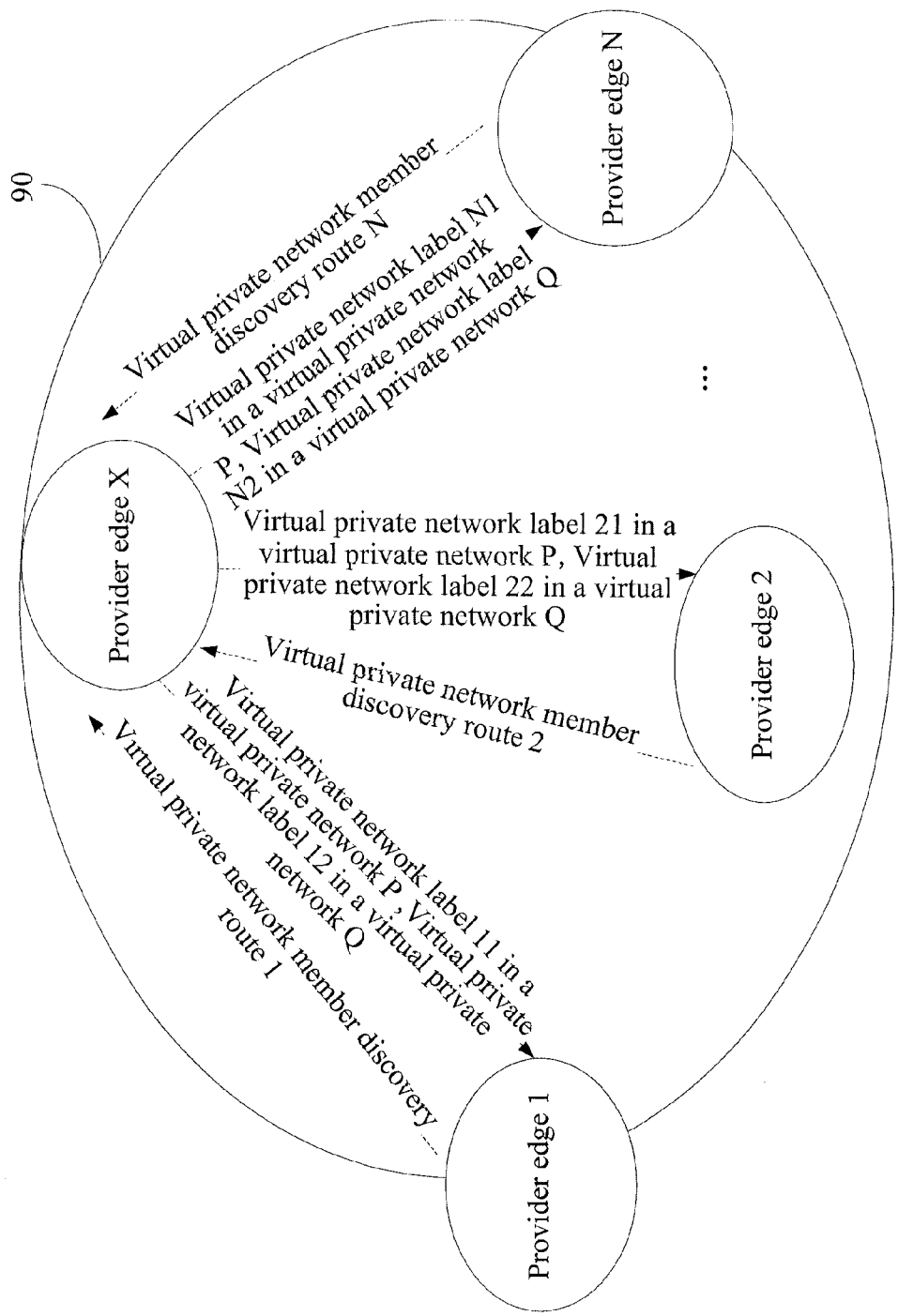
FIG. 9 is a schematic structural diagram of a communications system according to an embodiment of the present invention.

It should be noted that, in an actual application, for convenient use, the communications system may integrate, into a same PE, functions of the local provider edge and the remote provider edge that are provided in the embodiments of the present invention. Exemplarily, as shown in FIG. 9, a communications system 90 includes multiple PEs: a PEX, a PE1, a PE2, to a PEN. In the communications system 90, a local PE and a remote PE are relative, for example, from a perspective of the PEX, the PEX is a local PE, and the PE1, the PE2, to the PEN are remote PEs; and from a perspective of the PE1, the PE1 is a local PE, and the PEX, the PE2, to the PEN are remote PEs. In the embodiment of the present invention, the PEX being a local PE is used as an example. The PEX may belong to multiple VPNs, and if the PEX belongs to a VPN-P and a VPN-Q, the PE1, the PE2, to the PEN respectively generate VPN member discovery routes 1, 2, . . . , N and send the routes to PEs in the communications system 90. If the PE1, the PE2, to the PEN all belong to the VPN-P and the VPN-Q, export route targets, of at least two VRFs, matched with Import RTs in the VPN member discovery routes of the PE1, the PE2, to the PEN, exist in the PEX. The PEX generates, for each remote PE, a VPN label route including a different VPN label. Exemplarily, in the VPN-P, the PEX allocates VPN labels 11, 21, to N1 respectively to the PE1, the PE2, to the PEN; and in the VPN-Q, the PEX allocates VPN labels 12, 22, to N2 respectively to the PE1, the PE2, to the PEN, so that when specific information in the remote PE is the same as specific information in the VPN label route, the remote PE carries the VPN label in the VPN label route when sending a packet to the PEX, and the PEX distinguishes the sending end PE of the VPN label according to the received VPN label.

The embodiment of the present invention provides the communications system. Because a local PE sends a different VPN label route to each remote PE, when each remote PE sends a packet of a corresponding VPN to the local PE, the local PE can distinguish the sending end PE of the packet according to a different VPN label carried in the packet. Therefore, the local PE can distinguish packets from different remote PEs, and a foundation is laid for fault management and performance measurement of an L3VPN.

It may be clearly understood by a person skilled in the art that, for the purpose of ease and brevity of description, for a detailed working process of the foregoing system, apparatus, and unit, reference may be made to a corresponding process in the foregoing method embodiments, and details are not repeatedly described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A network label allocation method, comprising:
generating, by a local provider edge (PE), a Virtual Private Network (VPN) label route carrying a VPN label for each remote PE, wherein VPN labels in VPN label routes of different remote PEs are different, and the remote PE and the local PE at least belong to a same VPN; and sending, by the local PE, the VPN label route to the remote PE, so that the remote PE separately matches an IP address of the remote PE with a target device IP address in the VPN label route, and matches an import route target RT of each virtual routing forwarding (VRF) of the remote PE with a route target RT in the VPN label route, so as to make the remote PE carry the VPN label when the remote PE sends, to the local PE, a packet related to a successfully matched VRF.

2. The method according to claim 1, wherein the VPN label route comprises: an IP address of the local PE, the route target RT, the target device IP address, and the VPN label.

3. The method according to claim 1, wherein before the generating, by a local provider edge PE, a VPN label route for each remote PE, the method further comprises:

receiving, by the local PE, a VPN member discovery route sent by the remote PE; and matching, by the local PE, an export route target RT of each VRF of the local PE with an import route target RT in the VPN member discovery route; and if the matching succeeds, determining that successfully matched VRFs in the remote PE and the local PE belong to a same VPN.

4. The method according to claim 3, wherein the VPN member discovery route comprises: the IP address of the remote PE and the import route target RT.

5. The method according to claim 3, wherein when the matching succeeds, the generating, by a local PE, a VPN label route for each remote PE comprises:

setting the target device IP address in the VPN label route to be the same as the IP address of the remote PE in the VPN member discovery route; and making the route target RT in the VPN label route comprise an export route target RT of the successfully matched VRF in the local PE.

6. A network label allocation method, comprising:

receiving, by a remote provider edge (PE), a Virtual Private Network (VPN) label route sent by a local PE, wherein the local PE and the remote PE at least belong to a same VPN, and the VPN label route comprises a VPN label different from that of another remote PE;

matching, by the remote PE separately, an IP address of the remote PE with a target device IP address in the VPN label route, and matching an import route target RT of each virtual routing forwarding (VRF) of the remote PE with a route target RT in the VPN label route; and carrying, by the remote PE, the VPN label when sending, to the local PE, a packet related to a successfully matched VRF, so that the local PE distinguishes the packet sent by the remote PE from a packet sent by the another remote PE.

7. The method according to claim 6, wherein the VPN label route comprises: an IP address of the local PE, the route target RT, the target device IP address, and the VPN label.

8. The method according to claim 6, wherein before the receiving, by a remote PE, a VPN label route sent by a local PE, the method further comprises:

generating, by the remote PE, a VPN member discovery route; and sending, by the remote PE, the VPN member discovery route to the local PE, so that the local PE determines whether the remote PE and the local PE belong to a same VPN.

9. The method according to claim 8, wherein the VPN member discovery route comprises: the IP address of the remote PE and an import route target RT.

10. The method according to claim 6, wherein after the matching, by the remote PE separately, an IP address of the remote PE with a target device IP address in the VPN label route, and matching an import route target RT of each virtual routing forwarding VRF of the remote PE with a route target RT in the VPN label route, the method further comprises:

when the IP address of the remote PE and the target device IP address in the VPN label route are the same, and an import route target RT, of a VRF, same as the route target RT in the VPN label route exists, determining that the matching succeeds, and importing the VPN label route in the successfully matched VRF in the remote PE.

11. The method according to claim 6, wherein the carrying, by the remote PE, the VPN label when sending, to the local PE, a packet related to a successfully matched VRF specifically comprises:

recording, by the remote PE, the successfully matched VRF and routing information in the successfully matched VRF; and sending, by the remote PE, the packet in a VPN to which the successfully matched VRF belongs, and when a next hop of a VPN route of the packet is the same as an IP address, of the local PE, recorded in label routing information in the VRF, carrying the VPN label in the packet according to label routing information in the successfully matched VRF.

12. A local provider edge, comprising:

a first generating unit, configured to generate a Virtual Private Network (VPN) label route for each remote provider edge (PE), wherein VPN labels in VPN label routes of different remote PEs are different, and the remote PE and the local PE at least belong to a same VPN; and a first sending unit, configured to send the VPN label route carrying a VPN label to the remote PE, so that the remote PE separately matches an IP address of the remote PE with a target device IP address in the VPN label route, and matches an import route target RT of each virtual routing forwarding (VRF) of the remote PE with a route target RT in the VPN label route, so as to make the remote PE carry the VPN label when the remote PE sends, to the local PE, a packet related to a successfully matched VRF.

13. The device according to claim 12, wherein the VPN label route comprises: an Internet Protocol IP address of the local PE, the route target RT, the target device IP address, and the VPN label.

14. The device according to claim 12, wherein the device further comprises:

a first receiving unit, configured to receive a VPN member discovery route sent by the remote PE; and a first matching unit, configured to match an export route target RT of each VRF of the local PE with an import route target RT in the VPN member discovery route; and if the matching succeeds, determine that successfully matched VRFs in the remote PE and the local PE belong to a same VPN.

15. The device according to claim 14, wherein the VPN member discovery route comprises: the IP address of the remote PE and the import route target RT.

16. The device according to claim 14, wherein when the matching succeeds, the first generating unit is further configured to:
set the target device IP address in the VPN label route to be the same as the IP address of the remote PE in the VPN member discovery route; and
make the route target RT in the VPN label route comprise an export route target RT of the successfully matched VRF in the local PE.

17. A remote provider edge, comprising:
a second receiving unit, configured to receive a Virtual Private Network (VPN) label route sent by a local provider edge (PE), wherein the local PE and the remote PE at least belong to a same VPN, and the VPN label route comprises a VPN label different from that of another remote PE;
a second matching unit, configured to separately match an IP address of the remote PE with a target device IP address in the VPN label route, and match an import route target RT of each virtual routing forwarding (VRF) of the remote PE with a route target RT in the VPN label route; and
a second sending unit, configured to carry the VPN label when the remote PE sends, to the local PE, a packet related to a successfully matched VRF, so that the local PE distinguishes the packet sent by the remote PE from a packet sent by the another remote PE.

18. The device according to claim 17, wherein the device further comprises:
a second generating unit, configured to generate a VPN member discovery route; and
a third sending unit, configured to send the VPN member discovery route to the local PE, so that the local PE determines whether the remote PE and the local PE belong to a same VPN.

19. The device according to claim 17, wherein the device further comprises:
an importing unit, configured to: when the IP address of the remote PE and the target device IP address in the VPN label route are the same, and an import route target RT, of a VRF, same as the route target RT in the VPN label route exists, determine that the matching succeeds, and import the VPN label route in the successfully matched VRF in the remote PE.

20. The device according to claim 17, wherein the third sending unit is specifically includes:
a recording subunit, configured to record the successfully matched VRF and routing information in the successfully matched VRF; and
a sending subunit, configured to send the packet in a VPN to which the successfully matched VRF belongs, and when a next hop of a VPN route of the packet is the same as an IP address, of the local PE, recorded in label routing information in the VRF, carry the VPN label in the packet according to label routing information in the successfully matched VRF.

* * * * *